(12) United States Patent
Kurata et al.

(10) Patent No.: US 10,574,910 B2
(45) Date of Patent: Feb. 25, 2020

(54) METHOD AND APPARATUS FOR CONTROLLING A LUMINANCE COMPOSITION UNIT

(71) Applicant: Sony Semiconductor Solutions Corporation, Kanagawa (JP)

(72) Inventors: Koji Kurata, Tokyo (JP); Yasushi Sato, Kanagawa (JP); Seiji Kayashima, Kanagawa (JP); Naoki Okamoto, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/552,025

(22) PCT Filed: Feb. 12, 2016

(86) PCT No.: PCT/JP2016/054144
§ 371 (c)(1),
(2) Date: Aug. 18, 2017

(87) PCT Pub. No.: WO2016/136501
PCT Pub. Date: Sep. 1, 2016

(65) Prior Publication Data
US 2018/0041719 A1 Feb. 8, 2018

(30) Foreign Application Priority Data

Feb. 26, 2015 (JP) .................................. 2015-036041

(51) Int. Cl.
*H04N 5/18* (2006.01)
*H04N 5/33* (2006.01)
(Continued)

(52) U.S. Cl.
CPC ........... *H04N 5/332* (2013.01); *H04N 5/2256* (2013.01); *H04N 9/045* (2013.01); *H04N 9/07* (2013.01);
(Continued)

(58) Field of Classification Search
CPC ........... H04N 2209/045; H04N 5/2256; H04N 5/332; H04N 9/045; H04N 9/07; H04N 9/083; H04N 9/68
(Continued)

(56) References Cited

U.S. PATENT DOCUMENTS 3,849,593 A * 11/1974 Brun ........................ H04N 9/64
348/575
4,007,481 A * 2/1977 St. John .................... G03H 1/00
348/41
(Continued)

FOREIGN PATENT DOCUMENTS

JP     2008-289000 A    11/2008
JP     2008-289001 A    11/2008
(Continued)

OTHER PUBLICATIONS

Alberto et al, Property of images in Bayer formats in the digital processing of images (Year: 2008).*
(Continued)

*Primary Examiner* — Shan E Elahi
(74) *Attorney, Agent, or Firm* — Wolf, Greenfield & Sacks, P.C.

(57) ABSTRACT

The present disclosure relates to an imaging apparatus, an imaging method, and a program that allow control of an invisible light component of a captured image without a mechanism that inserts and removes a filter that shields the invisible light component.
A luminance composition unit combines a luminance signal of a visible light component of a pixel signal of a captured
(Continued)

image including an invisible light component and the visible light component with the pixel signal. A chroma gain amplifier attenuates a chrominance signal of the visible light component. The present disclosure can be applied to an imaging apparatus and the like that include, for example, an optical filter that transmits visible light and infrared light, have pixels in an RGBW array, and perform a Bayer conversion process on a captured image.

13 Claims, 13 Drawing Sheets

(51) Int. Cl.
    *H04N 9/07*     (2006.01)
    *H04N 9/04*     (2006.01)
    *H04N 5/225*     (2006.01)
    *H04N 9/083*     (2006.01)
    *H04N 9/68*     (2006.01)

(52) U.S. Cl.
    CPC ............... *H04N 9/083* (2013.01); *H04N 9/68* (2013.01); *H04N 2209/045* (2013.01)

(58) Field of Classification Search
    USPC .......................................................... 348/164
    See application file for complete search history.

(56) References Cited

U.S. PATENT DOCUMENTS

| | | | |
|---|---|---|---|
| 4,510,521 A * | 4/1985 | Ruprecht | H04N 9/68 348/646 |
| 4,994,923 A * | 2/1991 | Itoh | H04N 9/7908 386/269 |
| 6,002,448 A * | 12/1999 | Hanai | H04N 5/208 348/630 |
| 6,902,527 B1 * | 6/2005 | Doguchi | A61B 1/00059 600/109 |
| 7,006,727 B2 * | 2/2006 | Morey | G02B 6/12007 385/24 |
| 7,258,663 B2 * | 8/2007 | Doguchi | A61B 1/00059 600/109 |
| 7,733,380 B1 * | 6/2010 | Cote | H04N 5/23212 348/220.1 |
| 8,135,068 B1 * | 3/2012 | Alvarez | H04N 19/176 375/240.12 |
| 8,369,640 B2 * | 2/2013 | Ishiga | G06T 5/50 358/3.26 |
| 8,665,340 B2 * | 3/2014 | Prentice | G03B 7/08 348/222.1 |
| 8,675,982 B2 * | 3/2014 | Ishiga | G06T 5/50 348/662 |
| 9,699,429 B2 | 7/2017 | Kaizu | |
| 9,784,887 B1 * | 10/2017 | Ulmer | G01W 1/02 |
| 10,110,825 B2 | 10/2018 | Kurata et al. | |
| 2002/0131702 A1 * | 9/2002 | Morey | G02B 6/12007 385/33 |
| 2002/0191266 A1 * | 12/2002 | Melloni | G02F 1/225 359/246 |
| 2003/0108201 A1 * | 6/2003 | Rumreich | H04N 9/45 380/213 |
| 2003/0231885 A1 * | 12/2003 | Kato | H04J 14/0223 398/98 |
| 2004/0143157 A1 * | 7/2004 | Doguchi | A61B 1/00059 600/109 |
| 2005/0213883 A1 * | 9/2005 | Welch | B82Y 20/00 385/37 |
| 2006/0221218 A1 * | 10/2006 | Adler | H04N 9/045 348/266 |
| 2007/0201738 A1 * | 8/2007 | Toda | H04N 9/045 382/144 |
| 2008/0021272 A1 * | 1/2008 | Doguchi | A61B 1/00059 600/109 |
| 2008/0180557 A1 * | 7/2008 | Egawa | H04N 9/045 348/294 |
| 2008/0218597 A1 * | 9/2008 | Cho | H04N 5/2351 348/222.1 |
| 2009/0290067 A1 * | 11/2009 | Ishiga | G06T 5/50 348/607 |
| 2010/0038543 A1 * | 2/2010 | Toda | H04N 9/045 250/339.05 |
| 2010/0239245 A1 * | 9/2010 | Yao | G01J 4/00 398/27 |
| 2010/0245616 A1 | 9/2010 | Yoshino et al. | |
| 2010/0283866 A1 | 11/2010 | Numata | |
| 2011/0050918 A1 | 3/2011 | Tachi | |
| 2011/0063451 A1 | 3/2011 | Kamon et al. | |
| 2011/0267492 A1 * | 11/2011 | Prentice | G03B 7/08 348/223.1 |
| 2012/0001072 A1 * | 1/2012 | Toda | H04N 9/045 250/339.05 |
| 2013/0163895 A1 * | 6/2013 | Ishiga | G06T 5/50 382/264 |
| 2013/0208110 A1 | 8/2013 | Wang et al. | |
| 2013/0272605 A1 | 10/2013 | Saito et al. | |
| 2014/0132796 A1 * | 5/2014 | Prentice | G03B 7/08 348/223.1 |
| 2014/0210964 A1 * | 7/2014 | Muijs | H04N 13/373 348/54 |
| 2017/0220000 A1 * | 8/2017 | Ozcan | G03H 1/0866 |
| 2017/0257584 A1 | 9/2017 | Fujita | |
| 2017/0276954 A1 * | 9/2017 | Bajorins | G02B 27/2235 |
| 2017/0280122 A1 | 9/2017 | Sato et al. | |
| 2017/0366723 A1 | 12/2017 | Kurata et al. | |

FOREIGN PATENT DOCUMENTS

| | | |
|---|---|---|
| JP | 2010-206436 A | 9/2010 |
| JP | 2010-227254 A | 10/2010 |
| JP | 5100615 B2 | 10/2012 |
| JP | 2013-081245 A | 5/2013 |
| JP | 2013-219705 A | 10/2013 |
| JP | 2013-255144 A | 12/2013 |
| WO | WO 2011/001672 A1 | 1/2011 |
| WO | WO 2013/183330 A1 | 12/2013 |

OTHER PUBLICATIONS

International Search Report and Written Opinion and English translation thereof dated Mar. 15, 2016 in connection with International Application No. PCT/JP2016/054144.
International Preliminary Report on Patentability and English translation thereof dated Sep. 8, 2017 in connection with International Application No. PCT/JP2016/054144.
International Preliminary Report on Patentability and English translation thereof dated Apr. 6, 2017 in connection with International Application No. PCT/JP2015/069745.
International Preliminary Report on Patentability and English translation thereof dated June 29, 2017 in connection with International Application No. PCT/JP2015/084390.
International Search Report and Written Opinion and English translation thereof dated Mar. 1, 2016 in connection with International Application No. PCT/JP2015/084390.
International Search Report and Written Opinion and English translation thereof dated Sep. 29, 2015 in connection with International Application No. PCT/JP2015/069745.

* cited by examiner

FIG. 3

|   |   |   |   |
|---|---|---|---|
| W+IR | G+IR | W+IR | G+IR |
| W+IR | R+IR | W+IR | B+IR |
| G+IR | W+IR | G+IR | W+IR |
| W+IR | B+IR | W+IR | R+IR |

A

|   |   |   |   |
|---|---|---|---|
| B | G | B | G |
| G | R | G | R |
| B | G | B | G |
| G | R | G | R |

| B | IR | B | IR |
| G | R | G | R |
| B | IR | B | IR |
| G | R | G | R |

A

| W+IR | G+IR | W+IR | G+IR |
| Ye+IR | W+IR | Cy+IR | W+IR |
| W+IR | G+IR | W+IR | G+IR |
| Cy+IR | W+IR | Ye+IR | W+IR |

B

METHOD AND APPARATUS FOR CONTROLLING A LUMINANCE COMPOSITION UNIT

CROSS-REFERENCE TO RELATED APPLICATIONS

This application claims the benefit under 35 U.S.C. § 371 as a U.S. National Stage Entry of International Application No. PCT/JP2016/054144, filed in the Japanese Patent Office as a Receiving Office on Feb. 12, 2016, which claims priority to Japanese Patent Application Number JP2015-036041, filed in the Japanese Patent Office on Feb. 26, 2015, each of which is hereby incorporated by reference in its entirety.

TECHNICAL FIELD

The present disclosure relates an imaging apparatus, an imaging method, and a program. In particular, the present disclosure relates to an imaging apparatus, an imaging method, and a program that allow control of an invisible light component of a captured image without a mechanism that inserts and removes a filter that shields the invisible light component.

BACKGROUND ART

An image sensor has sensitivity not only to visible light but also to infrared light. Therefore, in a case where photographing is performed using a camera with an image sensor under a light source including much infrared light, color reproduction is impaired by the influence of the infrared light. Accordingly, it has been proposed to achieve good color reproduction by providing a camera with an infrared (IR) cut filter (IRCF) that shields infrared light.

However, it is important to improve the night-time sensitivity of a surveillance camera or the like and thus secure visibility. Therefore, there is a camera including a mechanism that inserts and removes an IR cut filter and removes the IR cut filter during night-time and the like (for example, refer to Patent Document 1).

With such a camera including a mechanism that inserts and removes an IR cut filter, an amount of transmission of an infrared light component greatly changes, depending on the presence or absence of the IR cut filter. Therefore, particularly when infrared light is projected, blown-out highlights occur at the moment the IR cut filter is removed. As a result, the visibility of a captured image decreases.

Additionally, in a case where the insertion and removal of the IR cut filter is controlled on the basis of exposure information of the image sensor, it is necessary to prevent hunting at insertion and removal of the IR cut filter by differentiating illuminance at the removal from illuminance at the insertion. As a result, even in a case where the illuminance becomes high enough, the IR cut filter may not be inserted and a monochrome image may remain output as a captured image.

CITATION LIST

Patent Document

Patent Document 1: Japanese Patent No. 5100615

SUMMARY OF THE INVENTION

Problems to be Solved by the Invention

As described above, with a camera including a mechanism that inserts and removes a filter that shields an invisible light component, such as an IR cut filter, the image quality of a captured image deteriorates.

The present disclosure has been made in view of the above situation. It is an object of the present disclosure to allow control of an invisible light component of a captured image without a mechanism that inserts and removes a filter that shields the invisible light component.

Solutions to Problems

An imaging apparatus according to one aspect of the present disclosure is an imaging apparatus including a luminance composition unit that combines a luminance signal of a visible light component of an image signal including an invisible light component and the visible light component with the image signal, and an attenuation unit that attenuates a chrominance signal of the visible light component.

An imaging method and a program according to one aspect of the present disclosure correspond to an imaging apparatus according to one aspect of the present disclosure.

In one aspect of the present disclosure, a luminance signal of a visible light component of an image signal including an invisible light component and the visible light component is combined with the image signal, and a chrominance signal of the visible light component is attenuated.

Effects of the Invention

According to one aspect of the present disclosure, imaging is possible. Additionally, according to one aspect of the present disclosure, an invisible light component of a captured image can be controlled without a mechanism that inserts and removes a filter that shields the invisible light component.

Note that effects described herein are not necessarily limited. The effects may be any of the effects described in the present disclosure.

BRIEF DESCRIPTION OF DRAWINGS

FIG. 3 is a diagram for describing pixel arrays of an image before and after a Bayer conversion process.

FIG. 14 is a diagram illustrating an example of a non-Bayer array other than an RGBW pixel array.

MODE FOR CARRYING OUT THE INVENTION

Hereinafter, modes for carrying out the present disclosure (hereinafter referred to as "embodiments") will be described. Note that description will be made in the following order.

Figure 15:
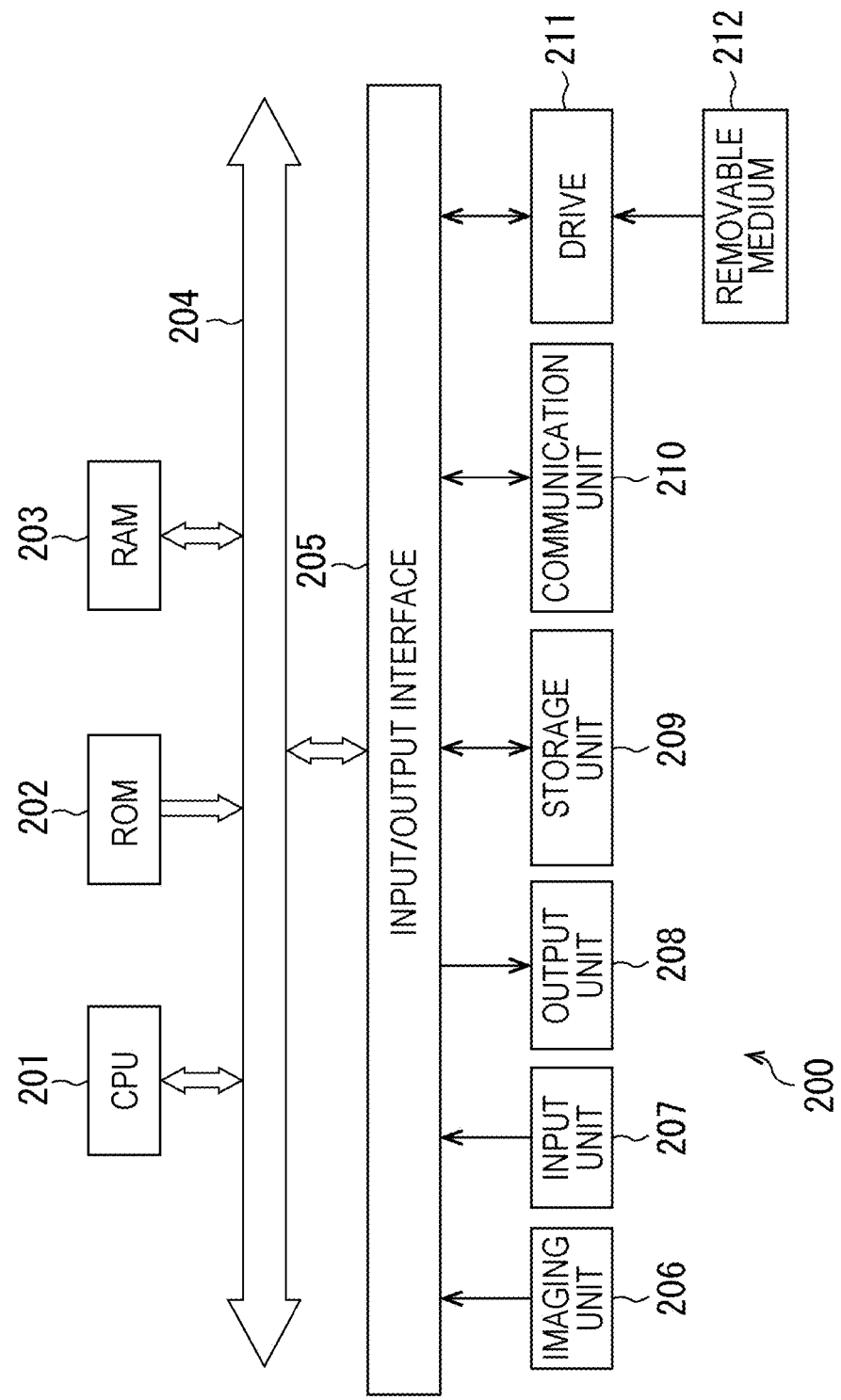
FIG. 15 is a block diagram illustrating an exemplary configuration of hardware in a computer.

1. First Embodiment: imaging system (FIGS. 1 to 13)
2. Other Example of Non-Bayer Array (FIG. 14)
3. Second Embodiment: computer (FIG. 15)

First Embodiment (Exemplary Configuration of First Embodiment of Imaging Apparatus)

Figure 1:
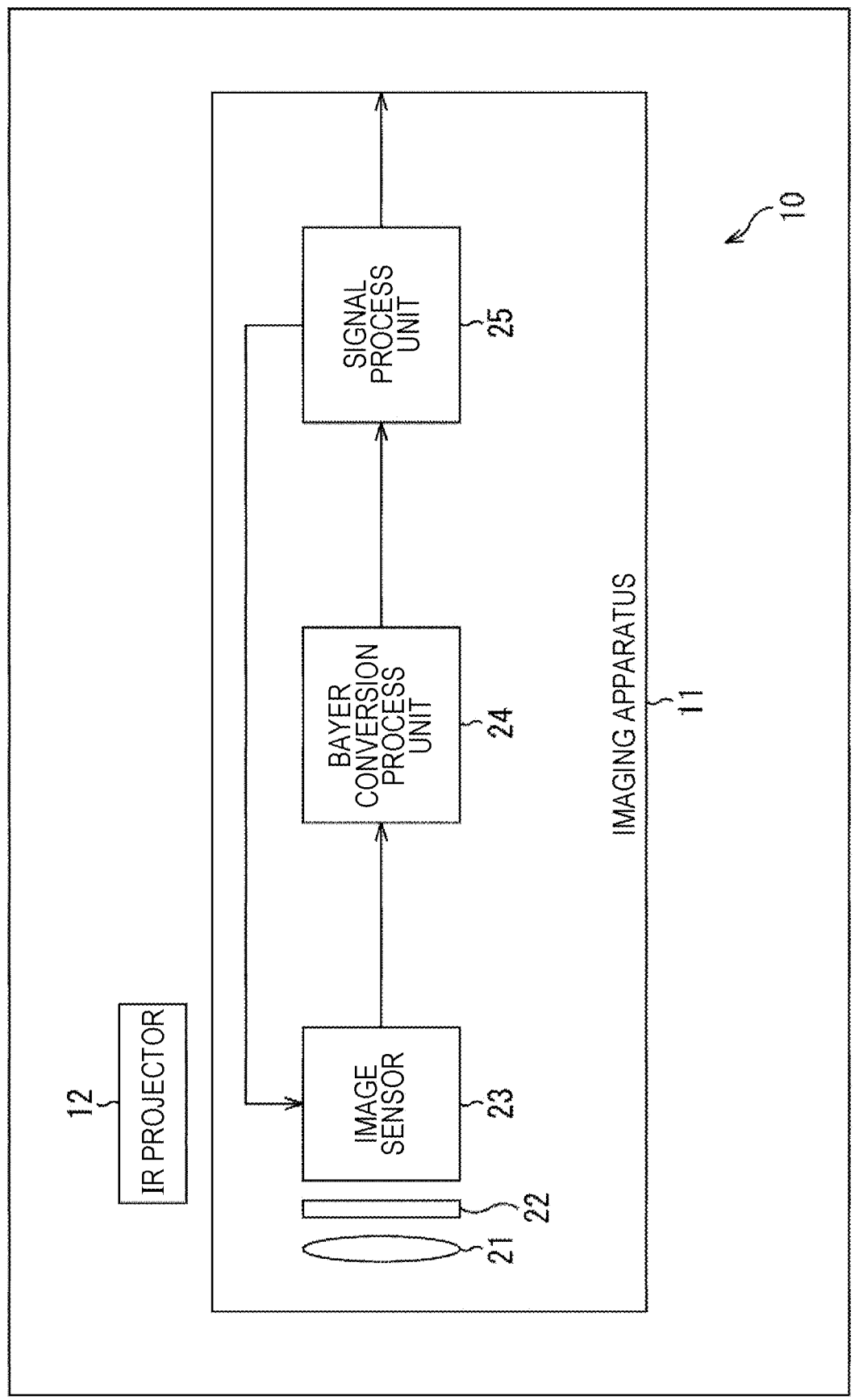
FIG. 1 is a block diagram illustrating an exemplary configuration of a first embodiment of an imaging system including an imaging apparatus to which the present disclosure has been applied.

FIG. 1 is a block diagram illustrating an exemplary configuration of a first embodiment of an imaging system including an imaging apparatus to which the present disclosure has been applied.

An imaging system 10 in FIG. 1 includes an imaging apparatus 11 and an IR projector 12. In the imaging system 10, an image corresponding to infrared light and visible light reflected by an object is captured.

In particular, the imaging apparatus 11 includes a lens 21, an optical filter 22, an image sensor 23, a Bayer conversion process unit 24, and a signal process unit 25.

Light from the object is incident on the lens 21 in the imaging apparatus 11. The lens 21 focuses the incident light to the image sensor 23 via the optical filter 22. The optical filter 22 transmits infrared light and visible light among the incident light. Note that the optical filter 22 may not be provided.

The image sensor 23 is a complementary metal-oxide semiconductor (CMOS) image sensor or a charge coupled device (CCD) image sensor, and has pixels in an RGBW pixel array. For each pixel, the image sensor 23 receives incident infrared light and light in a color (red (R), green (G), blue (B) or white (W)) corresponding to the pixel among visible light, and generates, as a pixel signal, an electric signal according to an amount of light received, thereby performing imaging in frame units. Therefore, a pixel signal of each pixel obtained as the result of the imaging includes an infrared light component as an invisible light component, and a visible light component. The image sensor 23 supplies, to the Bayer conversion process unit 24, the pixel signal of each pixel obtained as the result of the imaging, as a captured image.

The Bayer conversion process unit 24 performs a Bayer conversion process (re-mosaic process) for a captured image in a non-Bayer array supplied from the image sensor 23, and generates an RGB image in a Bayer array (RGB pixel array). The Bayer conversion process unit 24 supplies the generated RGB image in the Bayer array to the signal process unit 25.

The signal process unit 25 uses the RGB image supplied from the Bayer conversion process unit 24 and performs, as image development processes, signal processes including an exposure control process based on pixel signals of green pixels, a white balance control process, and a YCbCr conversion process. The signal process unit 25 supplies, to the image sensor 23, a shutter gain of the captured image that represents an exposure amount obtained as the result of the exposure control process, and controls the exposure amount. Additionally, the signal process unit 25 outputs a YCbCr image obtained as the result of performing the white balance control process and the YCbCr conversion process on the RGB image.

The IR projector 12 emits infrared light to an object, for example, during night-time in which less visible light is present.

(Example of Transmittance of Light Having Each Wavelength at Optical Filter)

Figure 2:
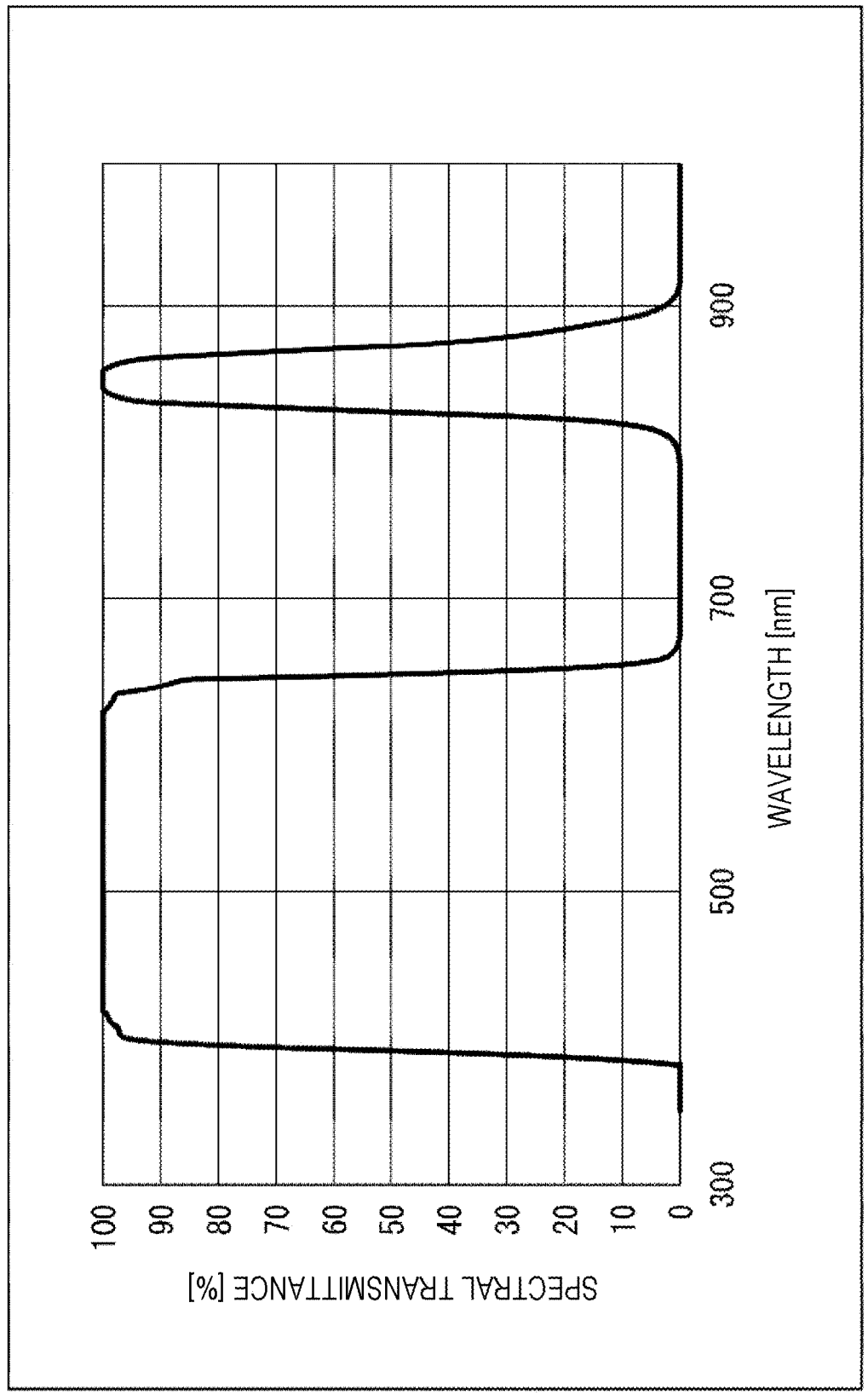
FIG. 2 is a diagram illustrating an example of transmittance of light having each wavelength at an optical filter in FIG. 1.

FIG. 2 is a diagram illustrating an example of transmittance of light having each wavelength at the optical filter 22 in FIG. 1.

In a graph in FIG. 2, the horizontal axis represents wavelengths (nm) of light that passes through the optical filter 22, and the vertical axis represents transmittance (%) of the light.

As illustrated in FIG. 2, at the optical filter 22, transmittance of visible light having a wavelength of about 390 nm to 660 nm and transmittance of infrared light having a wavelength of about 820 nm to 910 nm are larger than 0%. Therefore, visible light having a wavelength of about 390 nm to 660 nm and infrared light having a wavelength of about 820 nm to 910 nm pass through the optical filter 22.

(Description on Pixel Arrays of Image Before and After Bayer Conversion Process)

FIG. 3 is a diagram for describing pixel arrays of an image before and after a Bayer conversion process by the Bayer conversion process unit 24 in FIG. 1.

As illustrated in A of FIG. 3, the pixel array of the image before the Bayer conversion process, that is, a captured image output from the image sensor 23, is an RGBW pixel array. Additionally, a pixel signal of each pixel includes an infrared light (IR) component.

The Bayer conversion process unit 24 performs a Bayer conversion process on such an image before the Bayer conversion process, thereby generating an image in an RGB pixel array illustrated in B of FIG. 3, as an image after the Bayer conversion process.

(Exemplary Configuration of Bayer Conversion Process Unit)

Figure 4:
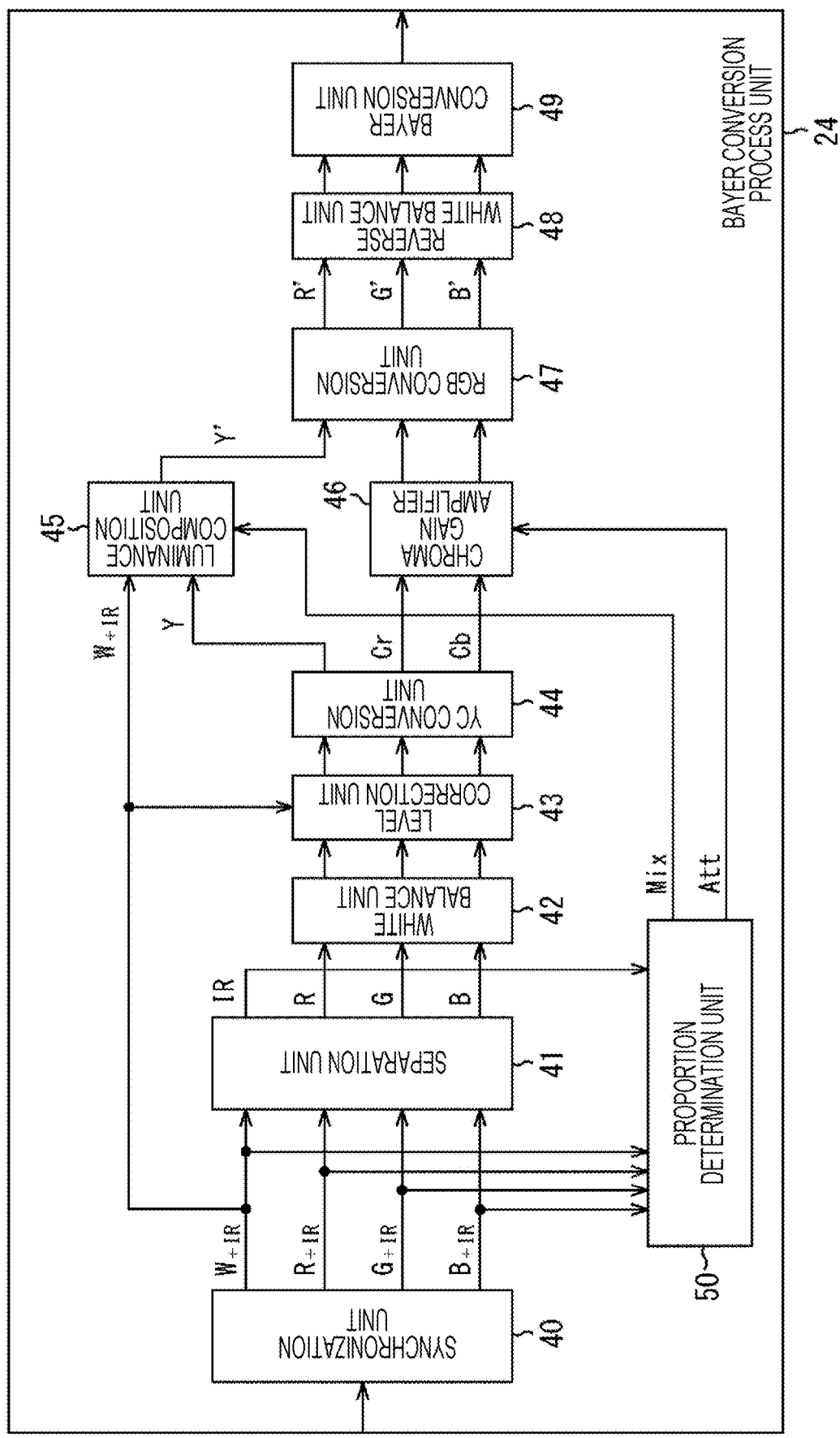
FIG. 4 is a block diagram illustrating an exemplary configuration of a Bayer conversion process unit in FIG. 1.

FIG. 4 is a block diagram illustrating an exemplary configuration of the Bayer conversion process unit 24 in FIG. 1.

The Bayer conversion process unit 24 includes a synchronization unit 40, a separation unit 41, a white balance unit 42, a level correction unit 43, a YC conversion unit 44, a luminance composition unit 45, a chroma gain amplifier 46, an RGB conversion unit 47, a reverse white balance unit 48, a Bayer conversion unit 49, and a proportion determination unit 50. The Bayer conversion process unit 24 removes an infrared light component from a captured image supplied from the image sensor 23 in FIG. 1, and performs the Bayer conversion process.

In particular, for each color of a pixel at the image sensor 23, the synchronization unit 40 in the Bayer conversion process unit 24 performs a complementary process for the captured image supplied from the image sensor 23. The synchronization unit 40 supplies, to the separation unit 41 and the proportion determination unit 50, pixel signals $W_{+IR}$, $R_{+IR}$, $G_{+IR}$, and $B_{+IR}$ that are pixel signals of colors in all pixels at the same time, the pixel signals $W_{+IR}$, $R_{+IR}$, $G_{+IR}$, and $B_{+IR}$ being generated as the result of the complementary process and including an infrared light component. Additionally, the synchronization unit 40 supplies the pixel signal $W_{+IR}$ to the level correction unit 43 and the luminance composition unit 45.

The separation unit 41 separates an infrared light component and a visible light component included in each of the pixel signals $W_{+IR}$, $R_{+IR}$, $G_{+IR}$, and $B_{+IR}$ supplied from the synchronization unit 40, according to the following formula (1), on the basis of the pixel signals $W_{+IR}$, $R_{+IR}$, $G_{+IR}$, and $B_{+IR}$.

[Formula 1]

$$[\{(R_{+IR})+(G_{+IR})+(B_{+IR})\}-(W_{+IR})]/2=IR$$

$$(R_{+IR})-IR=R$$

$$(G_{+IR})-IR=G$$

$$(B_{+IR})-IR=B \quad (1)$$

Note that IR represents the infrared light component included in each of the pixel signals $W_{+IR}$, $R_{+IR}$, $G_{+IR}$, and $B_{+IR}$. Additionally, R, G and B are visible light components of the pixel signals, $R_{+IR}$, $G_{+IR}$, and $B_{+IR}$.

The separation unit 41 supplies, to the white balance unit 42, visible light components R, G, and B obtained as the result of the separation, and supplies the infrared light component IR to the proportion determination unit 50.

The white balance unit 42 multiplies each of the visible light components R, G, and B supplied from the separation unit 41 by a white balance gain. Thus, a ratio of the visible light components R, G, and B (white balance) is corrected. The white balance unit 42 supplies, to the level correction unit 43, the visible light components R, G, and B after the correction.

The level correction unit 43 calculates a correction gain $C_E$, according to the following formula (2), on the basis of the visible light component G supplied from the white balance unit 42 and the pixel signal $W_{+IR}$ supplied from the synchronization unit 40.

[Formula 2]

$$C_E = \frac{Ave(W_{+IR})}{AveG} \quad (2)$$

Note that $Ave(W_{+IR})$ is an average value of the pixel signal $W_{+IR}$ for one frame, and $AveG$ is an average value of the visible light component G for one frame. According to formula (2), the correction gain $C_E$ to convert the visible light component G into the pixel signal $W_{+IR}$ is calculated.

The level correction unit 43 multiplies the correction gain $C_E$ calculated in the above manner by each of the visible light components R, G, and B from the white balance unit 42, thereby correcting the visible light components R, G, and B. Thus, the visible light component G after the correction becomes the same as the pixel signal $W_{+IR}$. As a result, the signal process unit 25 in FIG. 1 can control exposure to prevent the pixel signal $W_{+IR}$ from saturating, on the basis of a green pixel signal of the RGB image supplied from the Bayer conversion process unit 24. The level correction unit 43 supplies, to the YC conversion unit 44, the visible light components R, G, and B after the correction.

The YC conversion unit 44 converts the visible light components R, G, and B supplied from the level correction unit 43 into a luminance signal Y and chrominance signals Cb and Cr according to the following formula (3). The YC conversion unit 44 supplies the luminance signal Y to the luminance composition unit 45, and supplies the chrominance signals Cb and Cr to the chroma gain amplifier 46.

[Formula 3]

$$Y=0.299 \times R+0.587 \times G+0.114 \times B$$

$$Cb=0.168736 \times R-0.331264 \times G+0.5 \times B$$

$$Cr=0.5 \times R-0.418688 \times G-0.081312 \times B \quad (3)$$

The luminance composition unit 45 obtains, from the proportion determination unit 50, a mixing proportion Mix ($0 \leq Mix \leq 1$) that is a proportion of the pixel signal $W_{+IR}$ to a luminance signal Y' after the pixel signal $W_{+IR}$ is combined. The luminance composition unit 45 combines the luminance signal Y supplied from the YC conversion unit 44 with the pixel signal $W_{+IR}$ supplied from the synchronization unit 40, according to the following formula (4), on the basis of the mixing proportion Mix. The luminance composition unit 45 supplies, to the RGB conversion unit 47, the luminance signal Y' after the composition.

[Formula 4]

$$Y'=(1-Mix) \times Y+Mix \times (W_{+IR}) \quad (4)$$

The chroma gain amplifier 46 (attenuation unit) attenuates each of the chrominance signals Cb and Cr supplied from the YC conversion unit 44, on the basis of an attenuation proportion Att ($0 \leq Att \leq 1$) supplied from the proportion determination unit 50. That is, the chroma gain amplifier 46 multiplies each of the chrominance signals Cb and Cr by the attenuation proportion Att. The chroma gain amplifier 46 supplies the attenuated chrominance signals Cb and Cr to the RGB conversion unit 47.

The RGB conversion unit 47 converts the luminance signal Y' supplied from the luminance composition unit 45 and the chrominance signals Cb and Cr supplied from the chroma gain amplifier 46 into red, green, and blue pixel signals R', G', and B', and supplies the pixel signals R', G', and B' to the reverse white balance unit 48, according to the following formula (5).

[Formula 5]

$$R'=Y'+1.402 \times Cr$$

$$G'=Y'-0.344136 \times Cb-0.714136 \times Cr$$

$$B'=Y'+1.772 \times Cb \quad (5)$$

The reverse white balance unit 48 multiplies the pixel signals R', G', and B' supplied from the RGB conversion unit 47 by an inverse number of the white balance gain multiplied at the white balance unit 42. Thus, the white balance of the pixel signals R', G', and B' are controlled such that a ratio of an average value of signal levels of the red, green, and blue pixel signals in one image plane of the captured image before the Bayer conversion process that is output from the image sensor 23 and a ratio of an average value of signal levels of the red, green, and blue pixel signals in one image plane of the RGB image after the Bayer conversion process that is output from the Bayer conversion process unit 24 are the same. The reverse white balance unit 48 supplies, to the Bayer conversion unit 49, the pixel signals R', G', and B', the white balance of which is controlled.

The Bayer conversion unit 49 extracts, from the pixel signals R', G', and B' supplied for each pixel from the reverse white balance unit 48, a pixel signal of a color assigned to the pixel in a Bayer array. The Bayer conversion unit 49 supplies, to the signal process unit 25 in FIG. 1, the extracted pixel signal of each pixel as an RGB image in a Bayer array.

For each pixel in each frame, the proportion determination unit 50 calculates an integration value f (IR) obtained by adding up the proportions of the pixel signals $W_{+IR}$, $R_{+IR}$, $G_{+IR}$, and $B_{+IR}$ to the visible light components of all colors W, R, G, and B, according to the following formula (6).

[Formula 6]

$$f(IR) = \frac{(W_{+IR})}{(W_{+IR}) - IR} + \frac{(R_{+IR})}{(R_{+IR}) - IR} + \frac{(G_{+IR})}{(G_{+IR}) - IR} + \frac{(B_{+IR})}{(B_{+IR}) - IR} \quad (6)$$

Then, the proportion determination unit 50 adds an average value of the integration values f (IR) for all pixels in the frame, an AGC that is a sum of an analog gain and a digital gain of the image sensor 23, and the correction gain $C_E$, and takes a resultant value as an index N that represents an amount of the infrared light component IR as an amount of noise. Note that the method of calculating the index N is not limited to the above-described method.

The proportion determination unit 50 determines a target value $Mix_{target}$ of the mixing proportion Mix on the basis of the index N such that the target value $Mix_{target}$ increases as the index N increases. Additionally, the proportion determination unit 50 determines a target value $Att_{target}$ of the attenuation proportion Att on the basis of the index N such that the target value $Att_{target}$ increases as the amount of noise increases.

The proportion determination unit 50 determines, as a mixing proportion Mix for the present frame, a value that is increased from a mixing proportion $Mix_{before}$ for a frame preceding the present frame by one frame, by a value obtained by dividing a difference between the target value $Mix_{target}$ and the mixing proportion $Mix_{before}$ by a predetermined value 1/F, according to the following formula (7). Then, the proportion determination unit 50 supplies the mixing proportion Mix to the luminance composition unit 45.

[Formula 7]

$$Mix = Mix_{before} + (Mix_{target} - Mix_{before}) \times F \quad (7)$$

Note that F is a feedback ratio set by the user or the like and it is a value greater than 0 and equal to or less than 1.

Additionally, the proportion determination unit 50 determines, as an attenuation proportion Att for the present frame, a value that is increased from an attenuation proportion $Att_{before}$ for a frame preceding the present frame by one frame, by a value obtained by dividing a difference between the target value $Att_{target}$ and the attenuation proportion $Att_{before}$ by the predetermined value 1/F, according to the following formula (8). Then, the proportion determination unit 50 supplies the attenuation proportion Att to the chroma gain amplifier 46.

[Formula 8]

$$Att = Att_{before} + (Att_{target} - Att_{before}) \times F \quad (8)$$

Note that the feedback ratio F in formula (7) and the feedback ratio F in formula (8) may be the same or different values. Additionally, information used to determine the target value $Mix_{target}$ and the target value $Att_{target}$ are not limited to the index N as long as the information is an index that represents an image quality.

(Relationship Between Index N and Amount of Noise)

Figure 5:
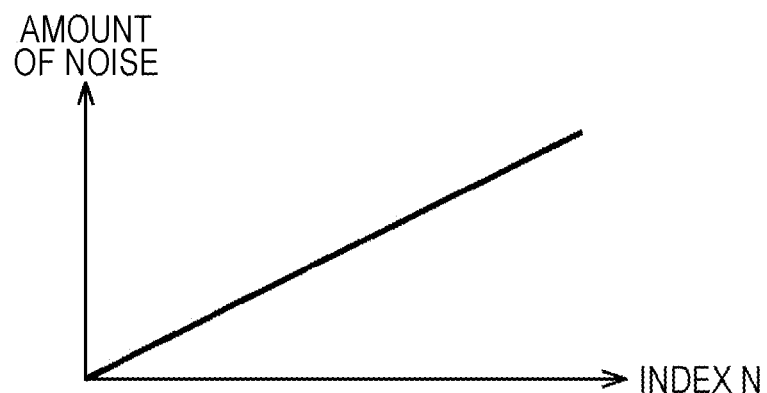
FIG. 5 is a diagram illustrating an example of a relationship between an index and an amount of noise.

FIG. 5 is a diagram illustrating an example of a relationship between an index N and the amount of noise.

As illustrated in FIG. 5, the index N increases as the amount of noise increases.

(Relationship Between Index N and Target Value $Mix_{target}$)

Figure 6:
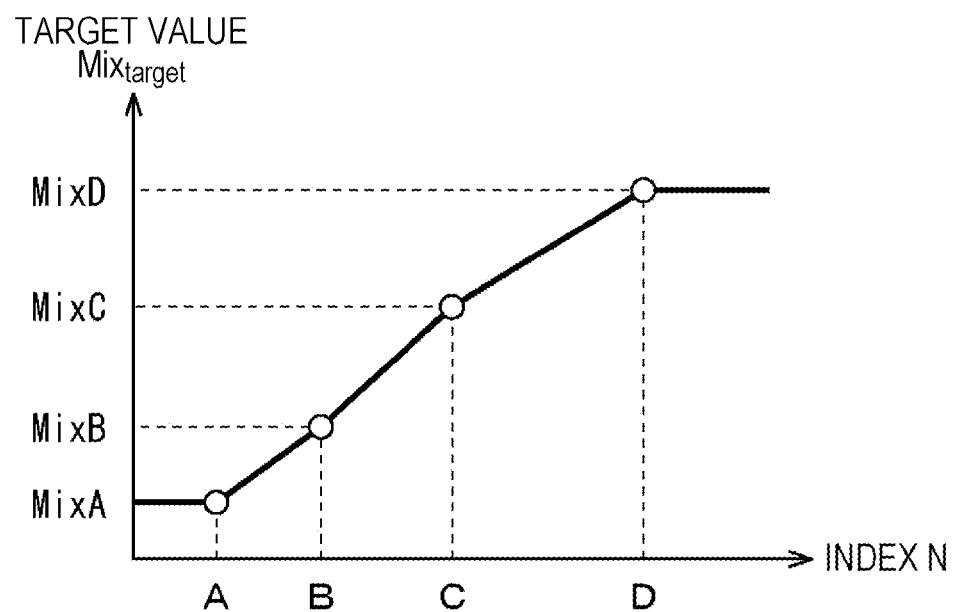
FIG. 6 is a diagram illustrating an example of a relationship between the index and a target value $\text{Mix}_{target}$.

FIG. 6 is a diagram illustrating an example of a relationship between the index N and the target value $Mix_{target}$.

Note that in a graph in FIG. 6, a horizontal axis represents the index N, and a vertical axis represents the target value $Mix_{target}$.

As illustrated in FIG. 6, the target value $Mix_{target}$ increases as the index N increases, that is, as the amount of noise increases. In particular, in an example in FIG. 6, in a case where the index N is smaller than a predetermined value A, the target value $Mix_{target}$ is a predetermined value MixA. In a case where the index N is the predetermined value A or more and a predetermined value B or less, the target value $Mix_{target}$ increases from the predetermined value MixA to a predetermined value MixB in proportion to the index N.

Additionally, in a case where the index N is the predetermined value B or more and a predetermined value C or less, the target value $Mix_{target}$ increases from the predetermined value MixB to a predetermined value MixC in proportion to the index N. In a case where the index N is the predetermined value C or more and a predetermined value D or less, the target value $Mix_{target}$ increases from the predetermined value MixC to a predetermined value MixD in proportion to the index N. Furthermore, in a case where the index N is greater than the predetermined value D, the target value $Mix_{target}$ is the predetermined value MixD.

(Relationship Between Index N and Target Value $Att_{target}$)

Figure 7:
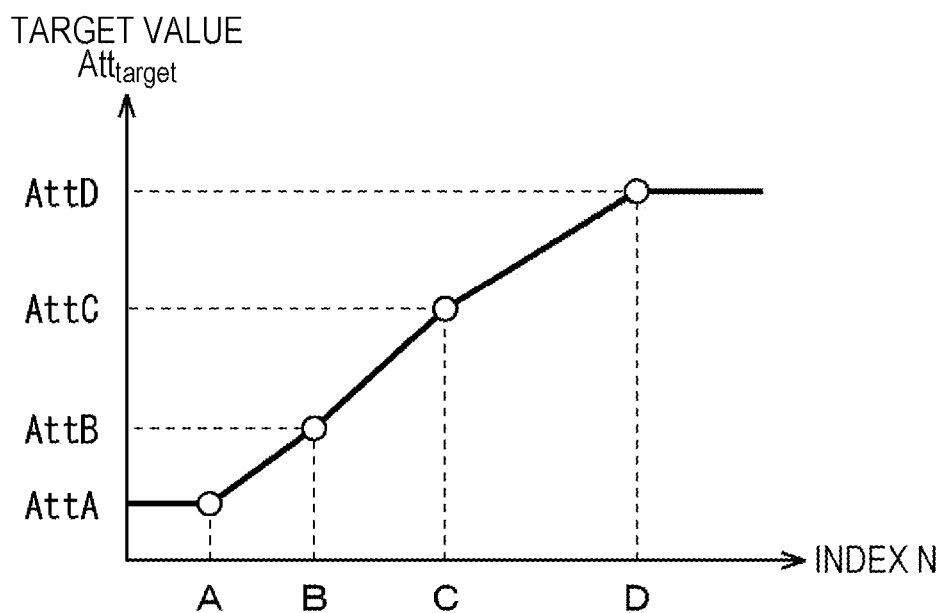
FIG. 7 is a diagram illustrating an example of a relationship between the index and a target value $\text{Att}_{target}$.

FIG. 7 is a diagram illustrating an example of a relationship between the index N and the target value $Att_{target}$.

Note that in a graph in FIG. 7, a horizontal axis represents the index N, and a vertical axis represents the target value $Att_{target}$.

As illustrated in FIG. 7, the target value $Att_{target}$ increases as the index N increases, that is, as the amount of noise increases. In particular, in an example in FIG. 7, in a case where the index N is smaller than a predetermined value A, the target value $Att_{target}$ is a predetermined value AttA. In a case where the index N is the predetermined value A or more and a predetermined value B or less, the target value $Att_{target}$ increases from the predetermined value AttA to a predetermined value AttB in proportion to the index N.

Additionally, in a case where the index N is the predetermined value B or more and a predetermined value C or less, the target value $Att_{target}$ increases from the predetermined value AttB to a predetermined value AttC in proportion to the index N. In a case where the index N is the predetermined value C or more and a predetermined value D or less, the target value $Att_{target}$ increases from the predetermined value AttC to a predetermined value AttD in proportion to the index N. Furthermore, in a case where the index N is greater than the predetermined value D, the target value $Att_{target}$ is the predetermined value AttD.

(Relationship Between Index N and Mixing Proportion Mix)

Figure 8:
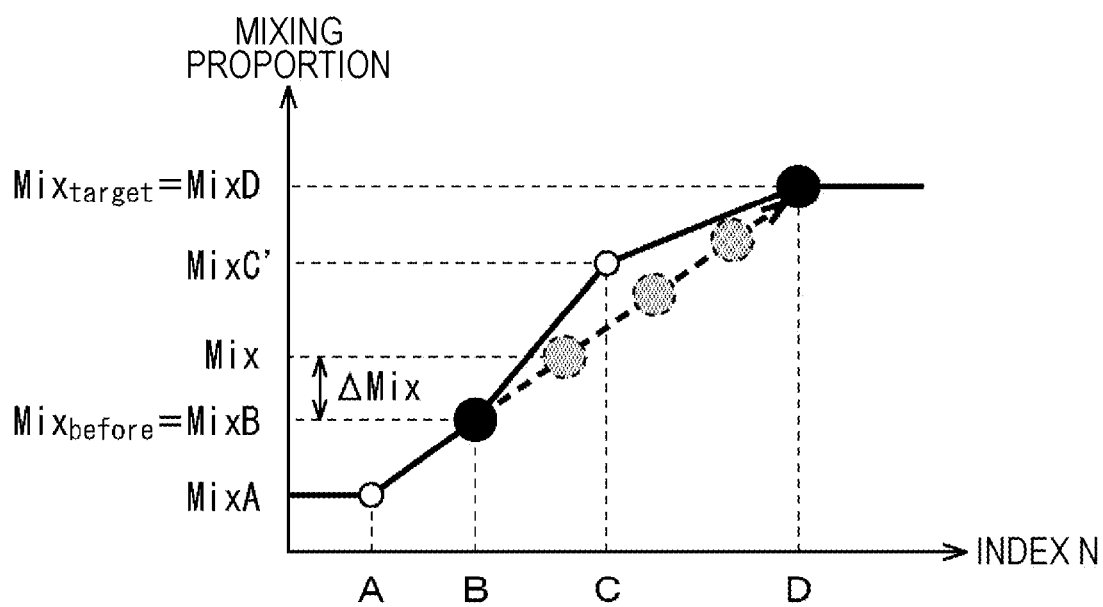
FIG. 8 is a diagram illustrating an example of a relationship between the index and a mixing proportion.

FIG. 8 is a diagram illustrating an example of a relationship between the index N and the mixing proportion Mix.

Note that in a graph in FIG. 8, a horizontal axis represents the index N, and a vertical axis represents a mixing proportion. Additionally, a relationship between the index N and the target value $Mix_{target}$ in FIG. 8 is the same as the relationship in FIG. 6 except that the predetermined value MixC is MixC' that is larger than the predetermined value MixC and smaller than the predetermined value MixD.

Furthermore, in an example in FIG. 8, a mixing proportion $Mix_{before}$ for a frame preceding the present one by one frame is the predetermined value MixB, an index N for the present frame is the predetermined value D, and the feedback ratio is ¼. In this case, the target value $Mix_{target}$ is the predetermined value MixD. The present mixing proportion Mix is a value that is increased from the predetermined value MixB by a value ΔMix obtained by dividing a difference between the predetermined value MixB and the predetermined value MixD by 4.

That is, the mixing proportion Mix does not change abruptly from the predetermined value MixB to the predetermined value MixD, but changes from the predetermined value MixB to the predetermined value MixD over four frames as if moving slowly.

(Description on Processes in Imaging Apparatus)

Figure 9:
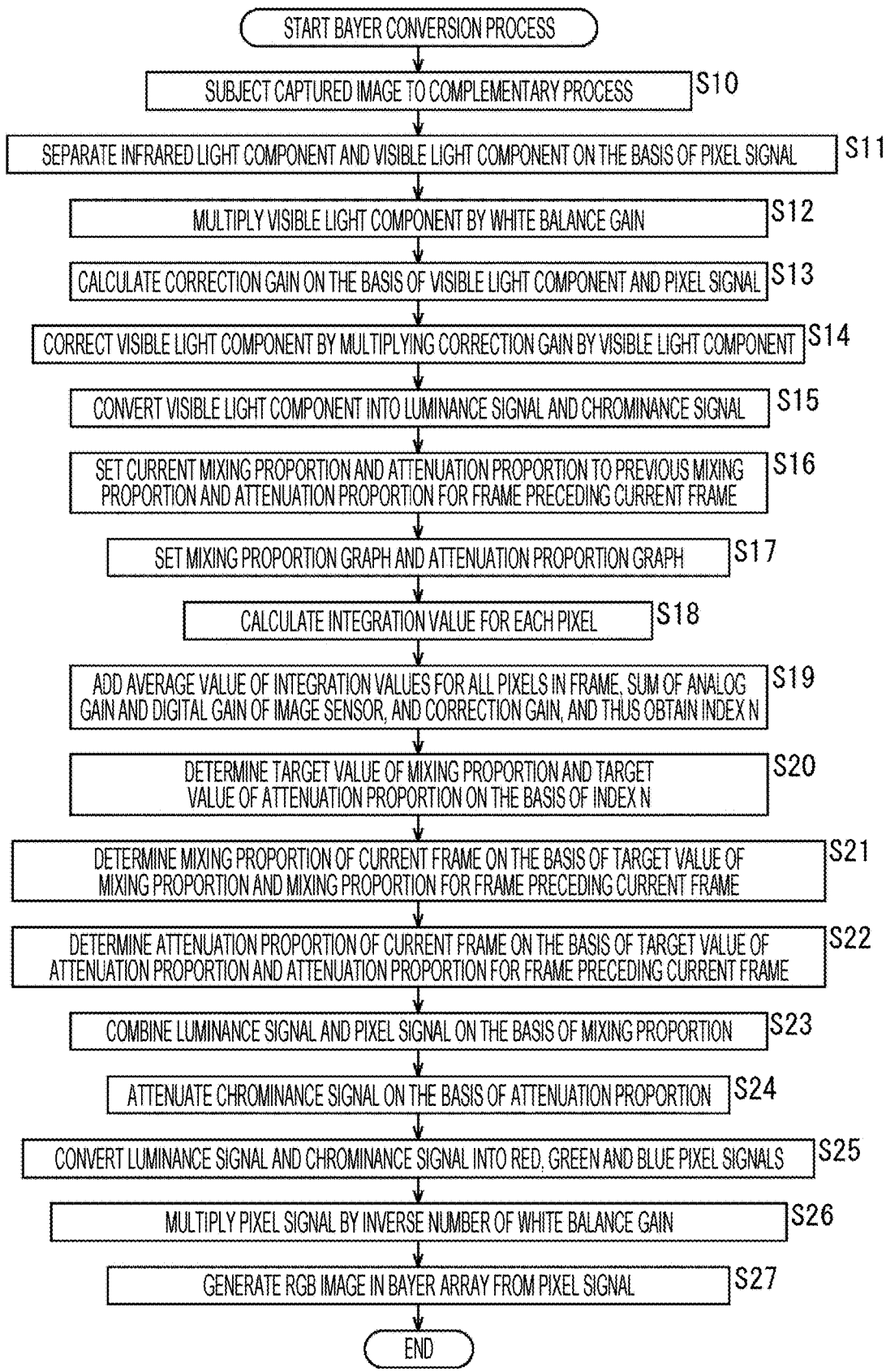
FIG. 9 is a flowchart for describing the Bayer conversion process by the imaging apparatus in FIG. 1.

FIG. 9 is a flowchart for describing the Bayer conversion process by the Bayer conversion process unit 24 in the imaging apparatus 11 in FIG. 1. This Bayer conversion process is performed, for example, in frame units.

In step S10 in FIG. 9, for each color of a pixel at the image sensor 23, the synchronization unit 40 in the Bayer conversion process unit 24 (FIG. 4) performs the complementary process on the captured image supplied from the image sensor 23. The synchronization unit 40 supplies, to the separation unit 41 and the proportion determination unit 50, pixel signals $W_{+IR}$, $R_{+IR}$, $G_{+IR}$, and $B_{+IR}$ generated as the result of the complementary process. Additionally, the synchronization unit 40 supplies the pixel signal $W_{+IR}$ to the level correction unit 43 and the luminance composition unit 45.

In step S11, the separation unit 41 separates the infrared light component and the visible light component included in each of the pixel signals $W_{+IR}$, $R_{+IR}$, $G_{+IR}$, and $B_{+IR}$ supplied from the synchronization unit 40, on the basis of the pixel signals $W_{+IR}$, $R_{+IR}$, $G_{+IR}$, and $B_{+IR}$ according to the above-described formula (1). The separation unit 41 supplies, to the white balance unit 42, visible light components R, G, and B obtained as the result of the separation, and supplies the infrared light component IR to the proportion determination unit 50.

In step S12, the white balance unit 42 multiplies each of the visible light components R, G, and B supplied from the separation unit 41 by a white balance gain, and supplies, to the level correction unit 43, the visible light components R, G, and B after the correction.

In step S13, the level correction unit 43 calculates a correction gain $C_E$, on the basis of the visible light component G supplied from the white balance unit 42 and the pixel signal $W_{+IR}$ supplied from the synchronization unit 40, according to the above-described formula (2).

In step S14, the level correction unit 43 multiplies the correction gain $C_E$ and each of the visible light components R, G, and B from the white balance unit 42, thereby correcting the visible light components R, G, and B. The level correction unit 43 supplies, to the YC conversion unit 44, the visible light components R, G, and B after the correction.

In step S15, the YC conversion unit 44 converts the visible light components R, G, and B supplied from the level correction unit 43 into a luminance signal Y and chrominance signals Cb and Cr according to the above-described formula (3). The YC conversion unit 44 supplies the luminance signal Y to the luminance composition unit 45, and supplies the chrominance signals Cb and Cr to the chroma gain amplifier 46.

In step S16, the proportion determination unit 50 sets the present mixing proportion Mix to the mixing proportion $Mix_{before}$ for a frame preceding the present frame by one frame, and sets the present attenuation proportion Att to the attenuation proportion $Att_{before}$ for the frame preceding the present frame by one frame.

In step S17, the proportion determination unit 50 sets a mixing proportion graph that shows a relationship between the index N and the target value $Mix_{target}$ (FIG. 6) and an attenuation proportion graph that shows a relationship between the index N and the target value $Att_{target}$ (FIG. 7).

In step S18, the proportion determination unit 50 calculates an integration value f (IR) for each pixel in the current frame, according to the above-described formula (6).

In step S19, the proportion determination unit 50 adds an average value of the integration values f (IR) for all pixels in the frame, an AGC that is a sum of an analog gain and a digital gain of the image sensor 23, and the correction gain $C_E$, and takes a resultant value as the index N.

In step S20, the proportion determination unit 50 refers to the index proportion graph and the attenuation proportion graph, and determines a target value $Mix_{target}$ of the mixing proportion Mix and a target value $Att_{target}$ of the attenuation proportion Att on the basis of the index N.

In step S21, the proportion determination unit 50 determines a mixing proportion Mix for the current frame, on the basis of the target value $Mix_{target}$ of the mixing proportion Mix and the mixing proportion $Mix_{before}$ for a frame preceding the current frame by one frame, according to the following formula (7). Then, the proportion determination unit 50 supplies the mixing proportion Mix to the luminance composition unit 45.

In step S22, the proportion determination unit 50 determines an attenuation proportion Att for the current frame, on the basis of the target value $Att_{target}$ of the attenuation proportion and the attenuation proportion $Att_{before}$ for a frame preceding the current frame by one frame, according to the following formula (8). Then, the proportion determination unit 50 supplies the attenuation proportion Att to the chroma gain amplifier 46.

In step S23, the luminance composition unit 45 combines the luminance signal Y supplied from the YC conversion unit 44 and the pixel signal $W_{+IR}$ supplied from the synchronization unit 40, on the basis of the mixing proportion Mix supplied from the proportion determination unit 50, according to the above-described formula (4).

In step S24, the chroma gain amplifier 46 attenuates each of the chrominance signals Cb and Cr supplied from the YC conversion unit 44, on the basis of the attenuation proportion Att supplied from the proportion determination unit 50. The chroma gain amplifier 46 supplies the attenuated chrominance signals Cb and Cr to the RGB conversion unit 47.

In step S25, the RGB conversion unit 47 converts the luminance signal Y' supplied from the luminance composition unit 45 and the chrominance signals Cb and Cr supplied from the chroma gain amplifier 46 into red, green, and blue pixel signals R', G', and B', according to the above-described formula (5). The RGB conversion unit 47 supplies the pixel signals R', G', and B' to the reverse white balance unit 48.

In step S26, the reverse white balance unit 48 multiplies the pixel signals R', G', and B' supplied from the RGB conversion unit 47 by an inverse number of the white balance gain multiplied at the white balance unit 42, and supplies the pixel signals R', G', and B' to the Bayer conversion unit 49.

In step S27, the Bayer conversion unit 49 extracts, from the pixel signals R', G', and B' supplied for each pixel from the reverse white balance unit 48, a pixel signal of a color assigned to the pixel in a Bayer array, and generates an RGB image in a Bayer array. Then, the Bayer conversion unit 49 supplies the RGB image in the Bayer array to the signal process unit 25 in FIG. 1.

As described above, the imaging apparatus 11 combines the luminance signal Y and the pixel signal $W_{+IR}$, and attenuates the chrominance signals Cb and Cr. Therefore, the imaging apparatus 11 can control the invisible light component in the RGB image without a mechanism that inserts and removes an IR cut filter. As a result, blown-out highlights that occur in a case where an IR cut filter is removed from an imaging apparatus including a mechanism that inserts and removes the IR cut filter do not occur, and it is possible to improve the visibility of the RGB image.

Additionally, the imaging apparatus 11 determines the mixing proportion Mix and the attenuation proportion Att, on the basis of the index N based on the integration value f (IR). Therefore, it is possible to change the proportion of the invisible light component included in the RGB image after the Bayer conversion process, according to an amount of the infrared light component IR. That is, it is possible to change the RGB image after the Bayer conversion process from an RGB image that does not include an invisible light component to an RGB image that includes an invisible light component and vice versa in a phased manner, according to the amount of the infrared light component IR.

Furthermore, the index N is an index that represents an image quality. Therefore, the imaging apparatus 11 can even out the image quality of the RGB image after the Bayer conversion process regardless of an object and illuminance, by determining the mixing proportion Mix and the attenuation proportion Att on the basis of the index N. As a result, even in a case where the illuminance becomes high enough, the imaging apparatus can prevent a monochrome image from being output as an RGB image as with an imaging apparatus including a mechanism that inserts and removes an IR cut filter.

Additionally, the infrared light component IR is a component separated from the captured image captured by the image sensor 23. Therefore, it is possible to change the proportion of the invisible light component included in the RGB image after the Bayer conversion process, not only by an amount of infrared light emitted by the IR projector 12 inside the imaging system 10 but also by an amount of infrared light emitted by an IR projector outside the imaging system 10.

Furthermore, the imaging apparatus 11 does not determine the target value $Mix_{target}$ as is, as the mixing proportion Mix, but determines the mixing proportion Mix such that the target value $Mix_{target}$ is achieved at 1/F frame that is an inverse number of the feedback ratio F. Therefore, even in a case where the index N changes abruptly, the mixing proportion Mix changes slowly. Hence, in a case where the index N changes abruptly, it is possible to prevent an abrupt change in the proportion of the invisible light component included in the RGB image after the Bayer conversion process.

Similarly, since the imaging apparatus 11 determines the attenuation proportion Att such that the target value $Att_{target}$ is achieved at 1/F frame, the imaging apparatus 11 can prevent an abrupt change in the proportion of the invisible light component included in the RGB image after the Bayer conversion process in a case where the index N changes abruptly.

(Exemplary Configuration of IC Chip in Imaging Apparatus)

FIGS. 10 to 13 are diagrams illustrating an exemplary configuration of an integrated circuit (IC) chip in a case where the imaging apparatus 11 is formed in the IC chip.

Figure 10:
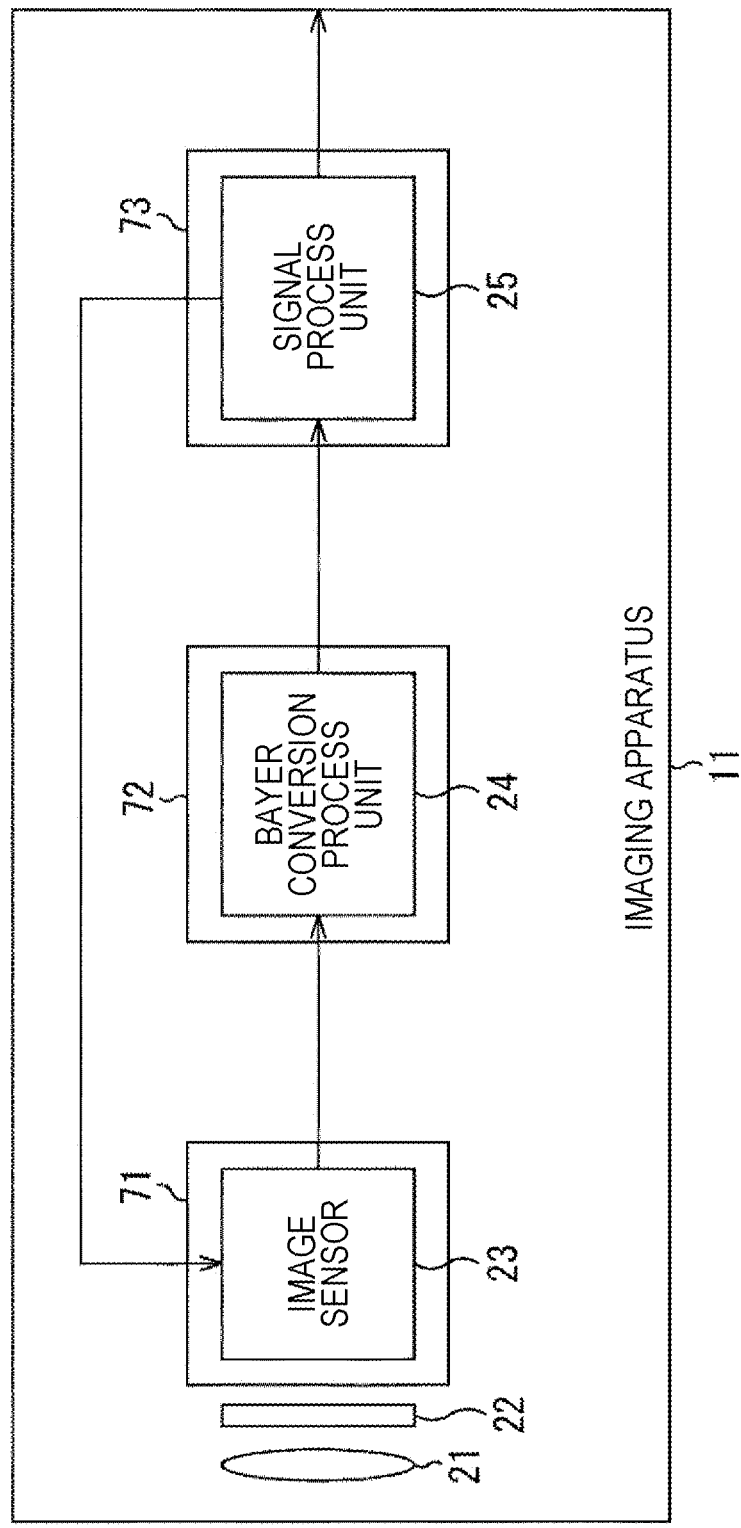
FIG. 10 is a diagram illustrating a first exemplary configuration of an IC chip in the imaging apparatus.

In a case where the imaging apparatus 11 is formed in the IC chip, as illustrated in FIG. 10, the image sensor 23, the Bayer conversion process unit 24, and the signal process unit 25 can be formed in different IC chips 71, 72, and 73, respectively.

Figure 11:
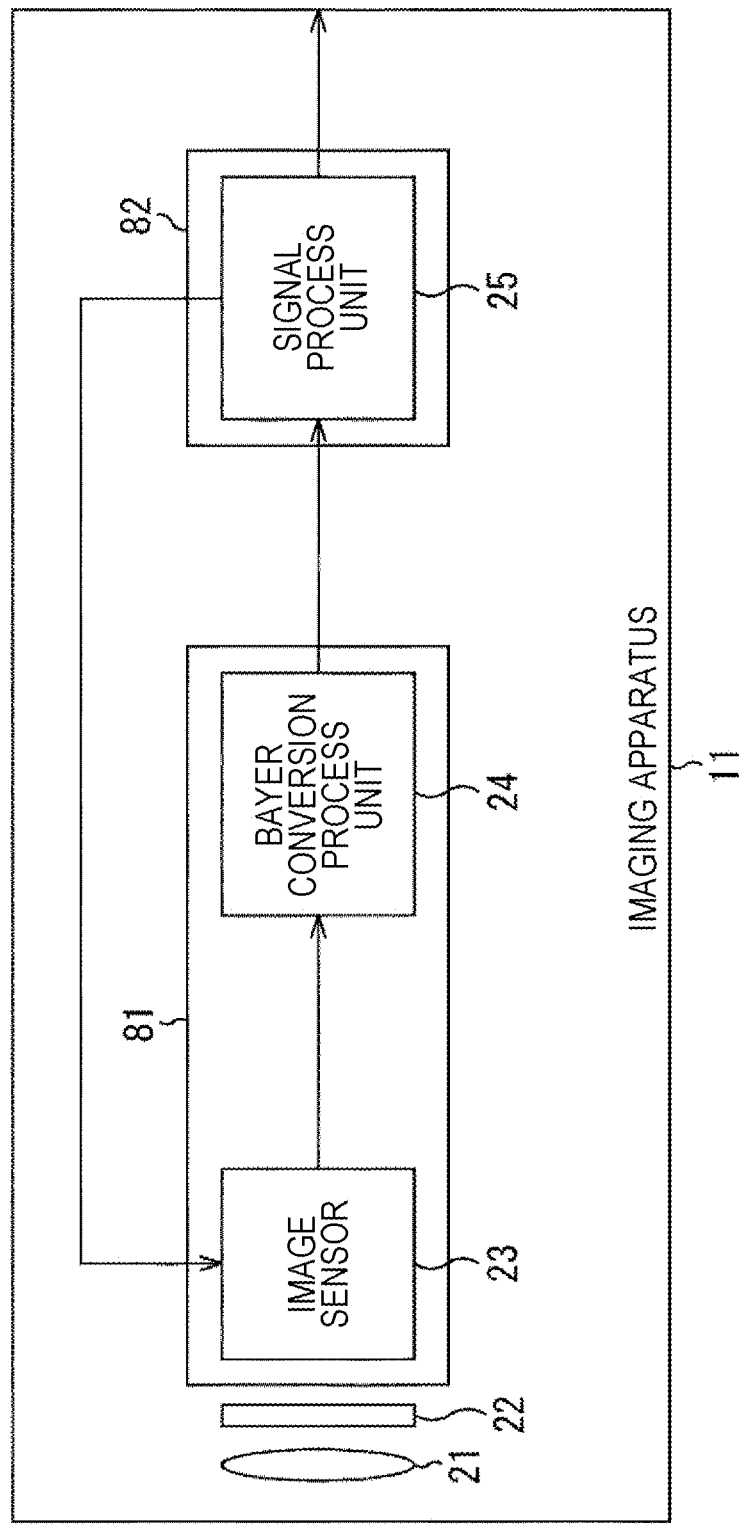
FIG. 11 is a diagram illustrating a second exemplary configuration of the IC chip in the imaging apparatus.
Figure 12:
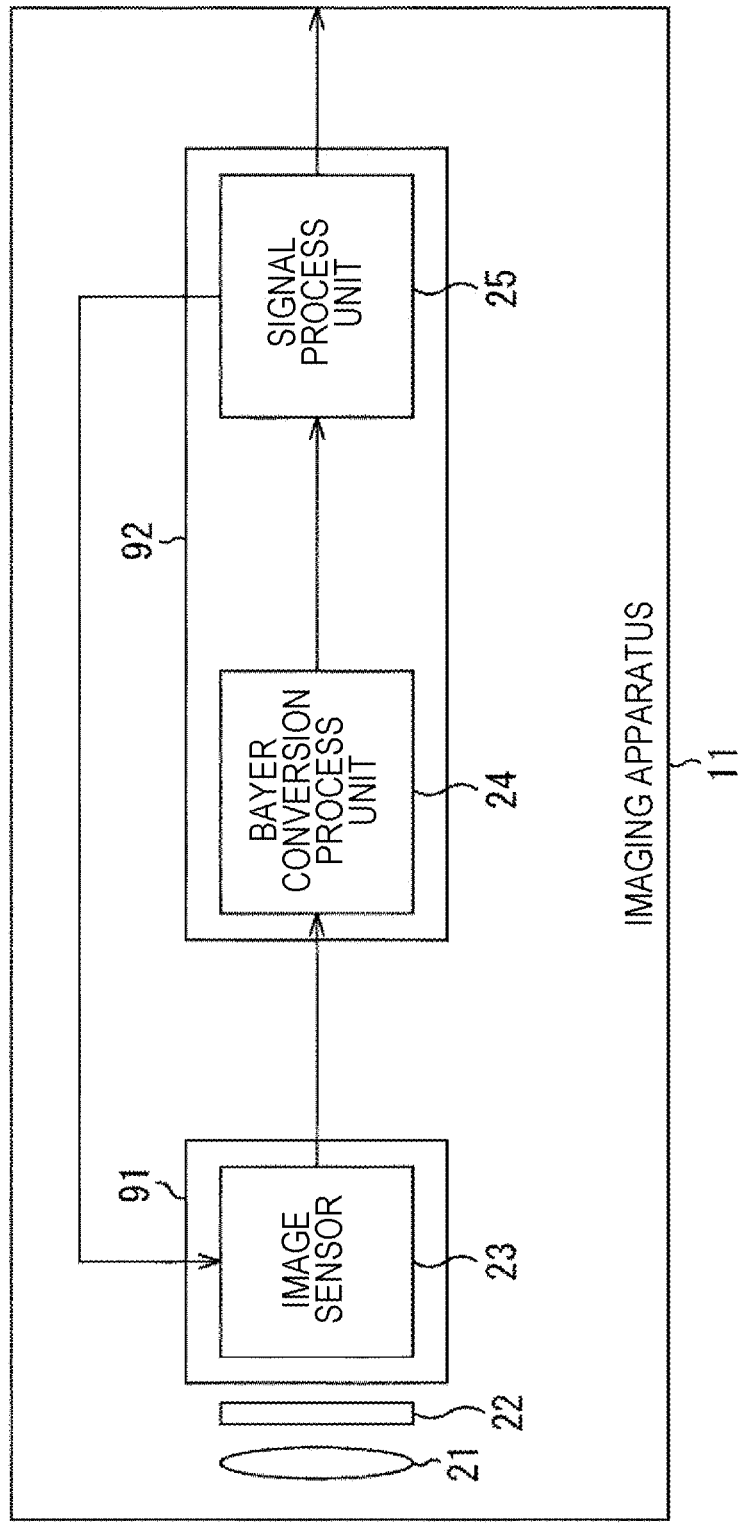
FIG. 12 is a diagram illustrating a third exemplary configuration of the IC chip in the imaging apparatus.

Alternatively, as illustrated in FIG. 11, the image sensor 23 and the Bayer conversion process unit 24 can be formed in the same IC chip 81, and the signal process unit 25 can be formed in an IC chip 82 different from the IC chip 81.

Figure 13:
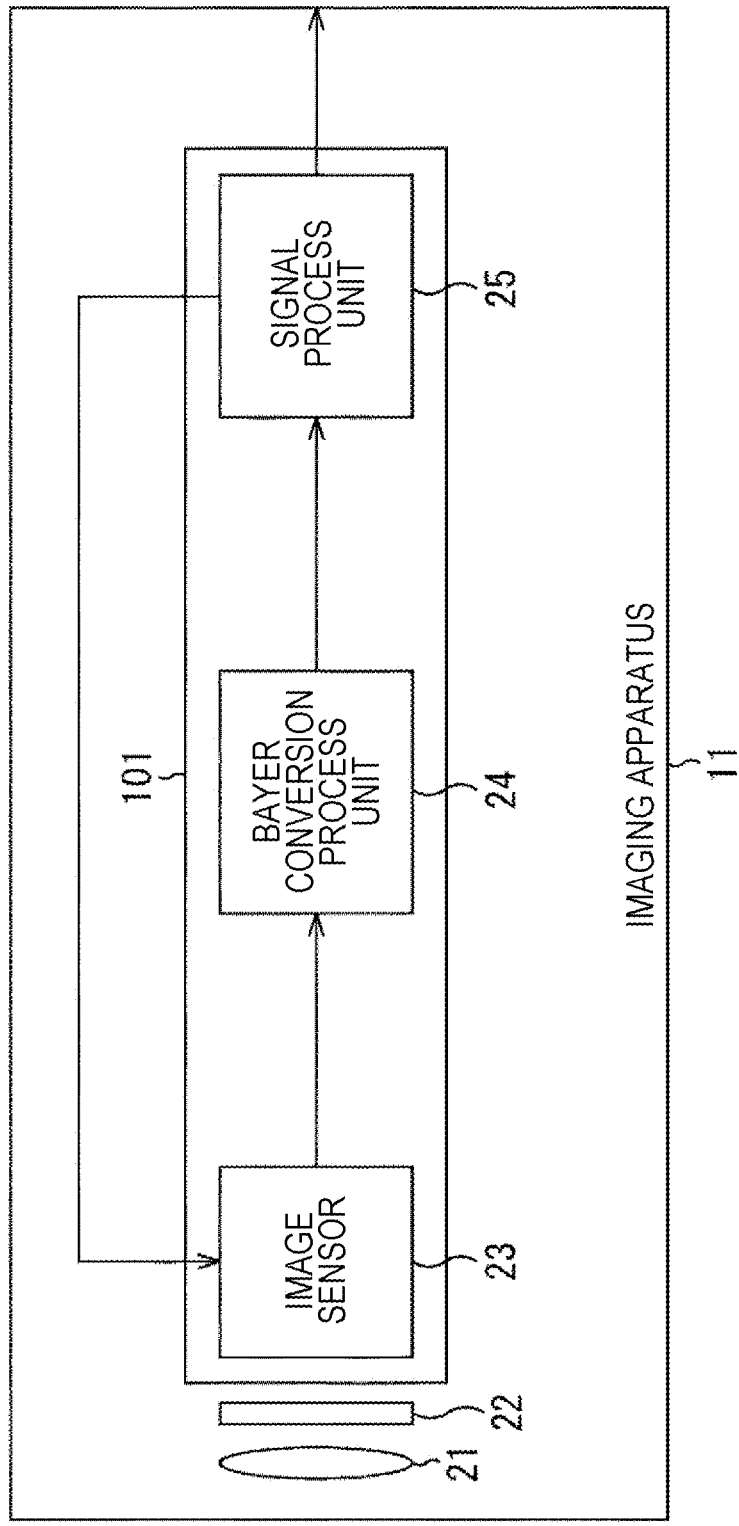
FIG. 13 is a diagram illustrating a fourth exemplary configuration of the IC chip in the imaging apparatus.

Furthermore, as illustrated in 12, the image sensor 23 can be formed in one IC chip 91, and the Bayer conversion process unit 24 and the signal process unit 25 can be formed in an IC chip 92 different from the IC chip 91. Alternatively, as illustrated in FIG. 13, the image sensor 23, the Bayer conversion process unit 24, and the signal process unit 25 can be all formed in the same IC chip 101.

Note that the lens 21 and the optical filter 22 are formed on the image sensor 23 in the IC chip 71 (81, 91, and 101) where the image sensor 23 is formed.

<Other Example of Non-Bayer Array>

The present technology can be applied to an image processing apparatus that performs a Bayer conversion process on a captured image in a non-Bayer array other than a captured image in an RGBW pixel array including an infrared light component.

FIG. 14 is a diagram illustrating an example of a non-Bayer array other than an RGBW pixel array.

A pixel array in A of FIG. 14 is an RGB+IR pixel array, and an image in which each pixel corresponds to any of red (R) light, green (G) light, blue (B) light, and infrared light (IR) is captured. A pixel array in B of FIG. 14 is a complementary color W pixel array, and an image in which each pixel corresponds to any of white (W) light, yellow (Ye) light, cyan (Cy) light, and green (G) light and to infrared light (IR) is captured.

Second Embodiment (Description on Computer to Which the Present Disclosure has Been Applied)

The above-described series of processes can be executed by hardware or by software. In a case where the series of processes is executed by software, a program that constitutes the software is installed in a computer. Herein, examples of the computer include a computer built in dedicated hardware, and a general-purpose personal computer on which various functions can be executed by installing various programs.

FIG. 15 is a block diagram illustrating an exemplary configuration of hardware of a computer that executes the above-described series of processes using the program.

In a computer 200, a central processing unit (CPU) 201, a read only memory (ROM) 202, and a random access memory (RAM) 203 are mutually connected by a bus 204.

An input/output interface 205 is further connected to the bus 204. An imaging unit 206, an input unit 207, an output unit 208, a storage unit 209, a communication unit 210, and a drive 211 are connected to the input/output interface 205.

The imaging unit 206 includes a lens 21, an optical filter 22, an image sensor 23 and the like, and performs imaging. The input unit 207 includes a keyboard, a mouse, a microphone, and the like. The output unit 208 includes a display, a speaker, and the like. The storage unit 209 includes a hard disk, a non-volatile memory, and the like. The communication unit 210 includes a network interface, and the like. The drive 211 drives a removable medium 212 such as a magnetic disk, an optical disc, a magneto-optical disc or a semiconductor memory.

In the computer 200 configured as described above, the CPU 201 performs the above-described processes, for example, by loading into the RAM 203 and executing a program stored in the storage unit 209, via the input/output interface 205 and the bus 204.

The program executed by the computer 200 (CPU 201) can be recorded in, for example, the removable medium 212 as a package medium or the like and provided. Additionally, the program can be provided via a wired or wireless transmission medium such as a local area network, the Internet, and digital satellite broadcasting.

In the computer 200, the program can be installed in the storage unit 209 via the input/output interface 205, by placing the removable medium 212 into the drive 211. Additionally, the program can be received at communication unit 210 via the wired or wireless transmission medium, and then installed in the storage unit 209. In addition, the program can be installed in the ROM 202 or the storage unit 209 in advance.

Note that the program executed by the computer 200 may be a program in which the processes are performed in chronological order as described herein or a program in which the processes are performed, in parallel, or at necessary timing at which, for example, the program is invoked.

As used herein, a system refers to collection of a plurality of constituent elements (e.g., a device and a module (component)), irrespective of whether all the constituent elements are present in the same housing. Therefore, a plurality of devices housed in different housings and connected via a network, and one device including one housing where a plurality of modules is housed are the system.

Additionally, effects described herein are merely exemplary and not limited, and there may be other effects.

Furthermore, embodiments according to the present disclosure are not limited to the above-described embodiments, and various modifications are possible within the scope not departing from the spirit of the present disclosure.

Note that the present disclosure can have the following configurations.

(1) An imaging apparatus including:
a luminance composition unit that combines a luminance signal of a visible light component of an image signal including an invisible light component and the visible light component with the image signal; and
an attenuation unit that attenuates a chrominance signal of the visible light component.

(2) The imaging apparatus described in above (1), further including a proportion determination unit that determines a mixing proportion that is a proportion of the image signal to the luminance signal with which the image signal has been combined by the luminance composition unit,
the luminance composition unit being configured to combine the luminance signal with the image signal on the basis of the mixing proportion determined by the proportion determination unit.

(3) The imaging apparatus described in above (2), in which the proportion determination unit is configured to determine the mixing proportion on the basis of the image signal and the visible light component.

(4) The imaging apparatus described in above (3), in which the proportion determination unit is configured to determine a target value of the mixing proportion on the basis of the image signal and the visible light component and to determine, as the mixing proportion, a value that is increased from a past mixing proportion by a value obtained by dividing a difference between the target value of the mixing proportion and the past mixing proportion by a predetermined value.

(5) The imaging apparatus described in above (3) or (4), in which the proportion determination unit is configured to determine the mixing proportion on the basis of the proportion of the image signal to the visible light component.

(6) The imaging apparatus described in above (5), in which the proportion determination unit is configured to determine the mixing proportion on the basis of an integration value obtained by adding up the proportions of the image signals to the visible light components of all colors.

(7) The imaging apparatus described in above (1), further including a proportion determination unit that determines an attenuation proportion of the chrominance signal,
the attenuation unit being configured to attenuate the chrominance signal on the basis of the attenuation proportion determined by the proportion determination unit.

(8) The imaging apparatus described in above (7), in which the proportion determination unit is configured to determine the attenuation proportion on the basis of the image signal and the visible light component.

(9) The imaging apparatus described in above (8), in which the proportion determination unit is configured to determine a target value of the attenuation proportion on the basis of the image signal and the visible light component and to determine, as the attenuation proportion, a value that is increased from a past attenuation proportion by a value obtained by dividing a difference between the target value of the attenuation proportion and the past attenuation proportion by a predetermined value.

(10) The imaging apparatus described in above (8) or (9), in which the proportion determination unit is configured to determine the mixing proportion on the basis of a proportion of the image signal to the visible light component.

(11) The imaging apparatus described in above (10), in which the proportion determination unit is configured to determine the mixing proportion on the basis of an integration value obtained by adding up the proportions of the image signals to the visible light components of all colors.

(12) An imaging method to be performed by an imaging apparatus, the imaging method including:
a luminance composition step of combining a luminance signal of a visible light component of an image signal including an invisible light component and the visible light component with the image signal; and
an attenuation step of attenuating a chrominance signal of the visible light component.

(13) A program that causes a computer to function as:
a luminance composition unit that combines a luminance signal of a visible light component of an image signal including an invisible light component and the visible light component with the image signal; and
an attenuation unit that attenuates a chrominance signal of the visible light component.

REFERENCE SIGNS LIST

11 Imaging apparatus
45 Luminance composition unit

46 Chroma gain amplifier
50 Proportion determination unit

The invention claimed is:

1. An imaging apparatus comprising:
   a luminance composition unit that digitally combines a luminance signal of a visible light component of an image signal including an invisible light component and the visible light component with the image signal; and
   a chroma gain amplifier that attenuates a chrominance signal of the visible light component.

2. The imaging apparatus according to claim 1, further comprising a proportion determination unit that determines a mixing proportion that is a proportion of the image signal to the luminance signal with which the image signal has been combined by the luminance composition unit,
   wherein the luminance composition unit is configured to combine the luminance signal with the image signal on the basis of the mixing proportion determined by the proportion determination unit.

3. The imaging apparatus according to claim 2,
   wherein the proportion determination unit is configured to determine the mixing proportion on the basis of the image signal and the visible light component.

4. The imaging apparatus according to claim 3,
   wherein the proportion determination unit is configured to determine a target value of the mixing proportion on the basis of the image signal and the visible light component and to determine, as the mixing proportion, a value that is increased from a past mixing proportion by a value obtained by dividing a difference between the target value of the mixing proportion and the past mixing proportion by a predetermined value.

5. The imaging apparatus according to claim 3,
   wherein the proportion determination unit is configured to determine the mixing proportion on the basis of the proportion of the image signal to the visible light component.

6. The imaging apparatus according to claim 5,
   wherein the proportion determination unit is configured to determine the mixing proportion on the basis of an integration value obtained by adding up the proportions of the image signals to the visible light components of all colors.

7. The imaging apparatus according to claim 1, further comprising a proportion determination unit that determines an attenuation proportion of the chrominance signal,
   wherein the attenuation unit is configured to attenuate the chrominance signal on the basis of the attenuation proportion determined by the proportion determination unit.

8. The imaging apparatus according to claim 7,
   wherein the proportion determination unit is configured to determine the attenuation proportion on the basis of the image signal and the visible light component.

9. The imaging apparatus according to claim 8,
   wherein the proportion determination unit is configured to determine a target value of the attenuation proportion on the basis of the image signal and the visible light component and to determine, as the attenuation proportion, a value that is increased from a past attenuation proportion by a value obtained by dividing a difference between the target value of the attenuation proportion and the past attenuation proportion by a predetermined value.

10. The imaging apparatus according to claim 8,
    wherein the proportion determination unit is configured to determine the mixing proportion on the basis of a proportion of the image signal to the visible light component.

11. The imaging apparatus according to claim 10,
    wherein the proportion determination unit is configured to determine the mixing proportion on the basis of an integration value obtained by adding up the proportions of the image signals to the visible light components of all colors.

12. An imaging method to be performed by an imaging apparatus, the imaging method comprising:
    a luminance composition step of digitally combining a luminance signal of a visible light component of an image signal including an invisible light component and the visible light component with the image signal; and
    an attenuation step performed by a chroma gain amplifier that attenuates a chrominance signal of the visible light component.

13. A nontransitory computer readable storage medium having computer executable instructions stored thereon that, when executed by a computer, cause the computer to function as:
    a luminance composition unit that digitally combines a luminance signal of a visible light component of an image signal including an invisible light component and the visible light component with the image signal; and
    a chroma gain amplifier that attenuates a chrominance signal of the visible light component.

* * * * *